June 7, 1927.
W. E. HUDSON
ELECTRIC HEATER
Filed March 30, 1925
1,631,484
2 Sheets-Sheet 1
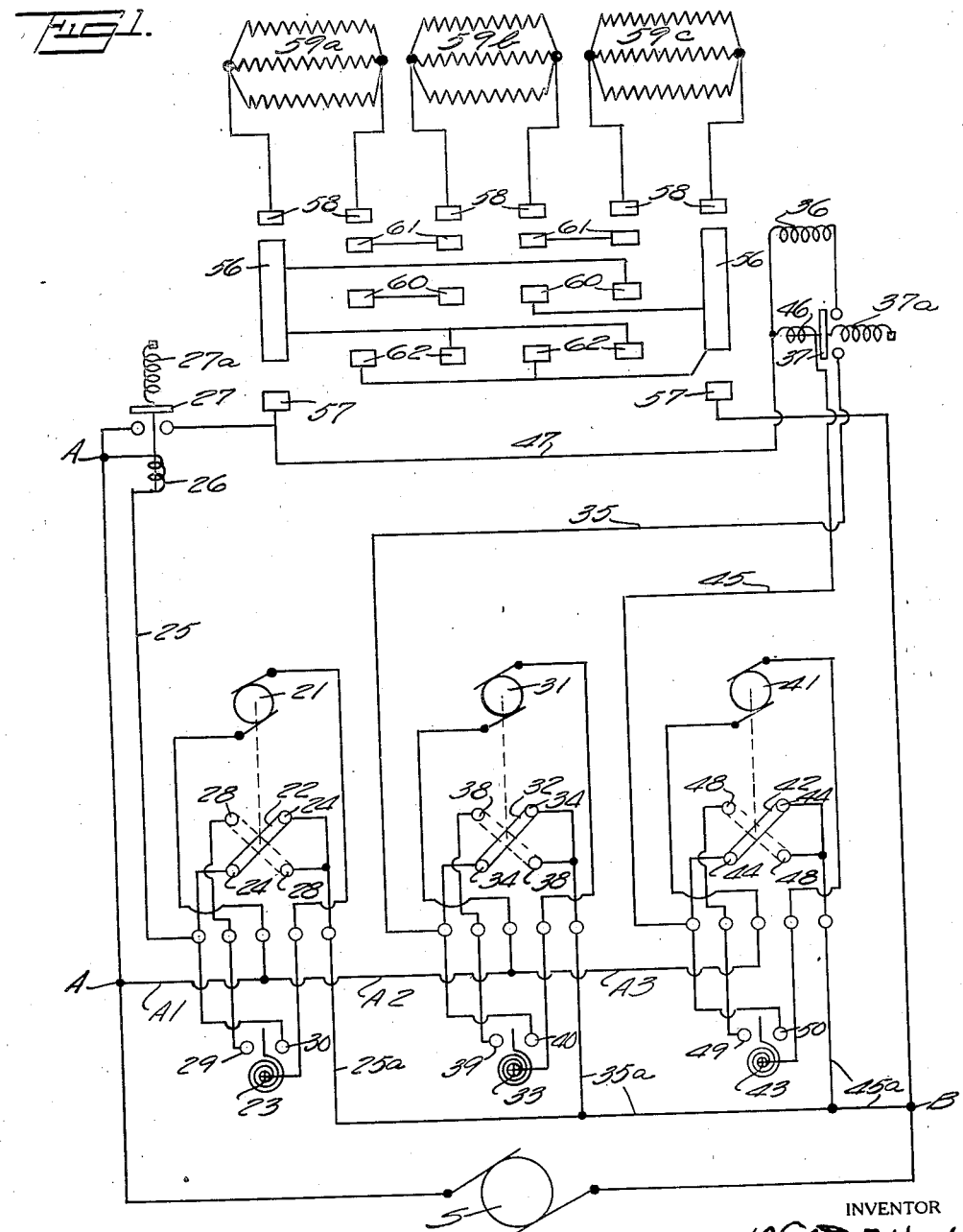
INVENTOR
Walter E. Hudson
BY
ATTORNEY June 7, 1927.
W. E. HUDSON
ELECTRIC HEATER
Filed March 30, 1925
1,631,484
2 Sheets-Sheet 2
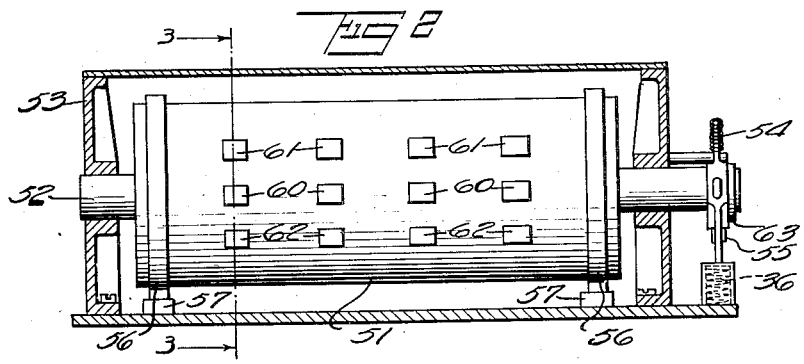
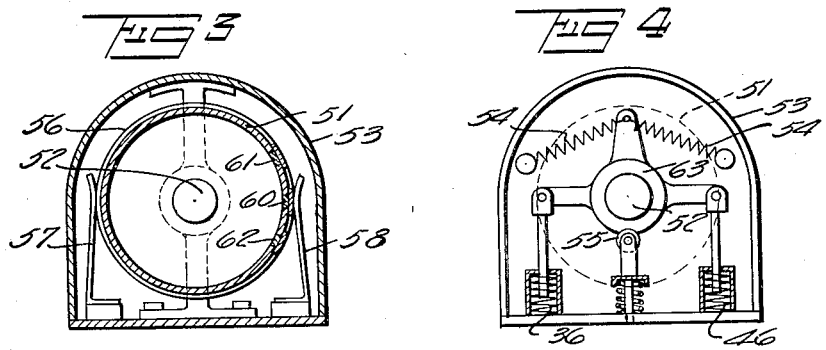
INVENTOR
Walter E. Hudson
BY
ATTORNEY Patented June 7, 1927.

1,631,484

UNITED STATES PATENT OFFICE.

WALTER E. HUDSON, OF AMAGANSETT, NEW YORK, ASSIGNOR TO HUDSON HEATING SYSTEMS, INC., OF NEW YORK, N. Y., A CORPORATION OF NEW YORK.

ELECTRIC HEATER.

Application filed March 30, 1925. Serial No. 19,202.

This invention relates generally to electric heaters and is more particularly designed to produce an arrangement of a plurality of resistors or heating coils, circuits in which said resistors or coils are included, switches for manual or automatic control of said circuits, and controlling devices sensitive to temperature for automatically operating said switches whereby the consumption of current for a given installation may be reduced and the life of the resistors prolonged. This application is in part a continuation of my pending application, Serial No. 672,367, filed November 2, 1923.

The underlying principle of the invention involves the employment of a plurality of resistors in each heating unit which may be connected up all in series, or all in multiple, or partly in series and partly in multiple according to the amount of heat to be generated, and, in its preferred form, also involves the employment of thermostatic devices variously disposed for automatically producing the variations in circuit connections necessary to secure the above indicated results.

The invention is particularly adapted for the heating of buildings, railway cars, and other spaces in which a substantially uniform temperature is to be maintained whatever the temperature of the external atmosphere.

The best form of apparatus at present known to me is illustrated in the accompanying two sheets of drawings in which, Fig. 1 is a general diagram of the electrical circuits with means controlled by thermostats for connecting together the coils of different electrical units in various relations to produce different amounts of heat from a current supply circuit of constant voltage.

Fig. 2 is a side view of the cylindrical switch used for this purpose, with its casing shown in section.

Fig. 3 is a cross section of said switch cylinder, on line 3—3 of Fig. 2, and

Fig. 4 is a view of the other end of the switch, showing the mechanism for rotating this cylinder.

Throughout the drawings like reference characters indicate like parts.

One object to be attained in any electric heating device is the prolonging of the life of the heating coils by subjecting them to the action of only a moderate amount of current when only a moderate degree of heat is required from them.

Another equally important object is reduction of the first cost of the heater by keeping the wire in it down to the minimum length and cross section which will still give the needed heat in midwinter, when carrying the maximum amount of current permissible without destructive action on the heater coils. Of course the current supplied is at a constant voltage and, if the coils of the heating element are connected up permanently in any one particular manner, the two sets of conditions tending to produce the two above desired results, are conflicting. According to my invention, however, both the above objects can be attained in one installation by dividing the heating wire thereof into a number of separate coils, each one of which will have a resistance just sufficient to raise it to the highest permissible temperature when current of this constant voltage is supplied to it, so that the maximum heat output may be obtained by connecting all these coils in multiple with the supply circuit, (as in mid-winter), and then providing means for connecting all or certain of these coils together in series groups, each of much greater total resistance than a single coil, when a less amount of heat is to be generated (as in fall or spring, or during mild winter days). When this is done one or another of the series connections can be used during eighty or ninety percent of the time the heater is in use, with the result that the wires are then heated only to moderate temperatures which they can endure for a long time, and yet, when a cold snap comes on for a few days the heater has the capacity, when its coils are all thrown into multiple connection, of maintaining the predetermined room temperature even if the exterior temperature drops to the lowest recorded degree for that locality.

Referring to the particular embodiment of the invention shown diagrammatically in Fig. 1, S is a dynamo or other source of electric current supply, A, A, one wire of the supply circuit fed therefrom and B the other. 59$^a$, 59$^b$ and 59$^c$ represent separate coils, or groups of coils in multiple, each of which coils or groups of coils has its separate current supply sub-circuit which several sub-circuits may be connected together or each connected directly to the main circuit A, B, or both. The three coils or groups of coils 59$^a$, 59$^b$ and 59$^c$ form the members of a heating unit or set, which unit may be placed in operative position in a water heater or steam boiler (as shown in my above noted pending application) or may be located in contact with the air in a room or car or other compartment which is to be heated directly. In any ordinary practical installation there would be a number of such heating units or sets in multiple with the main supply circuit A, B.

The coils of each member of all the sets may be bridged across the supply circuit in multiple or parallel from A to B, or the coil members 59$^a$ and 59$^b$ of each set may be connected in series across the supply circuit, while members 59$^c$ of each set are connected in multiple or parallel across said circuit, or all three members 59$^a$, 59$^b$, and 59$^c$, of each set may be connected in series, all these sets, of course, being in multiple across the supply circuit.

In the first above suggested arrangement all the members of all the sets of coils would carry the predetermined maximum current and deliver the maximum amounts of heat of which they were capable without rapid disintegration occurring as a result. In the second suggested arrangement the series coupled coil-pairs, 59$^a$ and 59$^b$ of each set would be heated only to a moderate degree, as the doubling of the total resistance resulting from connecting them in series would cut the current flowing through them to one half of the maximum permissible quantity, and the heat generated thereby to one quarter, but coil members 59$^c$ of each set would still be maintained at maximum temperature because they would be carrying full current. In the third above suggested arrangement, all of the coil members of all the sets would be but slightly heated because the total resistance caused by connecting all three members of each set in series would be three times that of one member, and this would reduce the current carried by each to one third of the maximum, and the heat generated thereby to one ninth of the amount created when the multiple connection is employed.

The problem then is to devise a circuit changing apparatus capable of producing these shifting arrangements of the connections from multiple to series-multiple and to series, and to operate this automatically by thermostatic means.

The basic method of regulation adopted is the usual one of opening and closing the supply circuit automatically by an adjustable thermostat placed in the house being heated. If this is set at 70 degrees Fahrenheit it opens the supply circuit when 70 degrees Fahrenheit is reached and closes it again when the temperature drops a predetermined number of degrees, say to 65° Fahrenheit.

The arrangement of the coil members of each set or unit either into series-multiple or into series relation is effected by a thermostat controlled by the circulating water or by an aquastat immersed in said heated water if a hot water heating system is used. When the water rises to 180 degrees Fahrenheit, or other predetermined point, the aquastat therein switches the coils into series, so that little more heat will be given to the water even while the supply circuit is closed; and, of course, whenever the room temperature rises to 70 the room thermostat will open the supply circuit and stop all heat generation. If an indirect air heating system were used this thermostat would be placed in the current of heated air. If the electric heaters are placed in the room to be heated this thermostat might be placed on the casing of such heater.

The arranging of all coil members of all sets in multiple or parallel across the supply circuit is effected by an outdoor thermostat so connected up with the switching system that when the atmospheric temperature drops to a given point, say 10 degrees Fahrenheit, this multiple arrangement will be produced and maintained as long as the outdoor temperature remains at or below 10 degrees. When that thermostat is subjected to a temperature above 10 degrees it reinstates the series-multiple arrangement. While the multiple arrangement is in existence, the second, or water controlled circuit, is disabled, so that there is no possibility of this arrangement of multiple connection being modified by any variation in water temperature. Regulation of room temperature is solely controlled by the opening or closing of the supply circuit by operation of the room thermostat first above referred to.

The foregoing operation and shifting of circuits to produce the described results in the manner outlined may be effected in a variety of ways, but the simplest apparatus now known to me is that shown herein in which: 21 is the motor for a motor-operated snap-switch 22, the circuit for which motor is controlled by thermostat 23 located in the house or apartment to be heated. 24, 24, are contacts which when bridged by switch 22 as indicated in full lines in Fig. 1, will close circuit 25, so that current will flow from A through solenoid 26, contacts 24 and wires 25$^a$, 35$^a$, and 45$^a$ to B. The consequent pull of solenoid 26 on its core will close circuit breaker 27, overcoming the tension of spring 27$^a$. This will connect the supply circuit with the heater coils 59$^a$, 59$^b$, and 59$^c$, however they may be connected together, and these coils will begin to heat the water in the hot water circulating system, if such system is employed, and the heated water will rise to the radiators in the rooms and begin to raise the temperature of the air therein. When this air is heated to 70 degrees the tongue of thermostat 23 will touch contact 30, current will flow from A through wire A$_1$, motor 21, thermostat 23, contact 30, switch 22 bridging contacts 24, 24, wires 25$^a$, 35$^a$ and 45$^a$ to B. This will operate motor 21 and snap switch 22 into dotted line position bridging contacts 28, 28, which opens circuit 25, deenergizes solenoid 26 and allows spring 27$^a$ to open circuit breaker 27, thus cutting off current from the heater. When thereafter the house interior cools down to 65 degrees thermostat 23 closes on contact 29, current passes from A through A$_1$, motor 21, thermostat 23, contact 29, switch contacts 28, 28, wires 25$^a$, etc. to B. This rotates snap switch 22 around to contacts 24, 24, again and cuts out the motor, leaving the switch in this position with the circuit closed through solenoid 26, which closes circuit breaker 27 and throws the heaters into operation again as originally described. This alternate opening and closing of the supply circuit to the heaters by operation of thermostat 23 controlled by room temperature goes on in all kinds of weather and whatever the internal arrangement of the heater circuits may be.

The next things in logical order of description of a hot water heating system are the internal heater circuits and the thermostat-controlled means for shifting their arrangement from multiple to series-multiple and series, as may best suit conditions.

These circuits are controlled by a rotatable master switch composed of a cylinder 51 of non-conducting material (Figs. 2, 3 and 4) which is mounted on shaft 52 in casing 53, and which carries certain contacts 56, 60, 61 and 62 cooperating with brushes or contact springs 57, 57, forming the terminals of the supply circuit, and with brushes 58, on the terminals of the heater coils. Contacts 56, are ring-shaped and simply rotate under the brushes 57 and under the end members of the series of brushes 58. Contacts 60 are connected to rings 56, or to one another, as shown in Fig. 1, so that when cylinder 51 is in the mid-position shown in Fig. 2 and four of the brushes 58 rest on these contacts 60, the heater coils 59$^a$ and 59$^b$ of each set will be connected in series one with the other across the supply circuit, while coil 59$^c$ of each set will be connected across the supply circuit separately. If cylinder 51 is thereafter rotated in a counter-clockwise direction (looking at Fig. 4) so that contacts 61 which are connected together in pairs as shown in Fig. 1, come under brushes 58, all the coils 59$^a$, 59$^b$ and 59$^c$, of each set will be connected together in series. If, on the other hand, cylinder 51 is rotated in a clock-wise direction so that brushes 58 rest on contacts 62, which are connected in pairs to rings 56, all three coils will be connected in multiple or parallel across the supply circuit.

The thermostatic control apparatus for effecting these partial rotations of the cylinder switch comprises a collar 63 fast on the end of shaft 52 and provided with an upwardly projecting arm to which the centering springs 54, 54 are connected, a notch on its under face with which spring pressed centering pin 55 engages, and laterally extending arms to which the cores of solenoids 36 and 46 are connected (all as shown in Fig. 4) together with thermostatically controlled circuits for energizing and deenergizing these solenoids.

When the switch cylinder 51 is in mid-position, as shown in Figs. 3 and 4, both solenoid circuits are open, and the heater coils are in series-multiple connection. If the water in the circulating system reaches 180 degrees the circuit through solenoid 36 is closed and cylinder 51 is rotated in a counter-clockwise direction to bring contacts 61 under brushes 58 and put the heater coils in series. If the out-door temperature falls to 10 above zero, the circuit through solenoid 46 is closed and 51 is rotated in a clock-wise direction to bring contacts 62 under brushes 58 and put the heater coils in multiple.

The circuits controlled by the temperature of the circulating water include aquastat 33, immersed therein, snap switch 32 and motor 31 for operating said switch. When the water temperature is below 180 but above 170 aquastat 33 is in mid-position. Solenoid 36 is not energized and springs 53 hold the parts in position shown in Figs. 2, 3 and 4. The heater coils are, therefore in series-multiple connection and the water temperature will gradually rise. When it reaches 180 aquastat 33 touches contact 39 and closes a circuit from A, through A$_1$, A$_2$, motor 31, aquastat 33, contact 39, switch 32 shown in dotted line position bridging contacts 38, 38, wires 35$^a$ and 45$^a$ to B. This operates motor 31 to snap switch 32 over into full line position and onto contacts 34, 34, which cuts out the motor and also completes a circuit from A through wire 47 (if circuit breaker 27 is closed), solenoid 36, circuit breaker 37

(if closed), wire 35, switch 32 bridging contacts 34, 34, wires 35ª and 45ª to B. This energizes solenoid 36 to rotate switch cylinder 51 in a counter-clockwise direction to bring contacts 61 under brushes 58 and thus puts the heater coils in series. The small amount of heat thereafter delivered from these series coils to the water may keep it between 180 and 170 for a long time, thus saving current, but whenever the water temperature falls to 170, aquastat 33 swings onto contact 40 and establishes a circuit from A through $A_1$, $A_2$, motor 31, aquastat 33, contact 40, switch 32 bridging contacts 34, 34, wires 35ª and 45ª to B. This rotates motor 31 and snaps switch 32 over onto contacts 38, 38, cutting out the motor and breaking the circuit through solenoid 36. Centering springs 54, 54 then pull cylinder switch 51 back into mid-position with contacts 60 under brushes 58, the heater coils go back into series-multiple connection and the necessary additional heat is then supplied by them to the circulating water to keep it above 170. Whenever the water temperature reaches 180 again the coils are put back in series as first above described.

The control by the out-door temperature is effected through thermostat 43 which is exposed to the outer atmosphere. So long as the outdoor temperature is above 10 degrees or any other predetermined temperature, thermostat 43 is either in mid-position or closed on contact 50, but as switch 42 is then in dotted line position bridging contacts 48, 48, (having been left there by a previous operation) the circuit through motor 41 and solenoid 46 is open at 44, 44, and cylinder switch 51 is left free to be controlled by solenoid 36 in the manner previously described. If the outdoor temperature falls below 10 degrees, however, thermostat 43 closes on contact 49. A circuit is then established from A, through $A_1$, $A_2$, $A_3$, motor 41, thermostat 43, contact 49, switch 42 in dotted line position bridging contacts 48, 48, and wire 45ª to B. This rotates the motor and snaps switch 42 into full line position onto contacts 44, 44. This cuts out the motor but establishes a circuit from A through wire 47 (if circuit breaker 27 is closed) through solenoid 46, wire 45, switch 42 bridging contacts 44, 44, and wire 45ª to B. Solenoid 46 being thus energized rotates cylinder switch 51 in a clockwise direction putting contacts 62 under their cooperating brushes 58 and throwing the heater coils 59ª, 59ᵇ and 59ᶜ into multiple, or parallel arrangement across the supply circuit. This puts the heater in condition to consume the maximum current and deliver its maximum output. Whenever the outdoor temperature rises a predetermined amount above 10 degrees solenoid 43 swings óver onto contact 50 and establishes a circuit from A through $A_1$, $A_2$, $A_3$, motor 41, thermostat 43, contact 50, switch 42 in full line position bridging contacts 44, 44, and wire 45ª to B. This rotates the motor, snapping switch 42 onto contacts 48, 48, thereby cutting out the motor and also opening the circuit through solenoid 46, which is thereby de-energized and allows springs 54, 54 to recenter the switch cylinder 51 and reestablish the series-multiple arrangement of heater coils which give out enough heat to keep the house warm in ordinary winter weather, above 10 degrees Fahrenheit.

To prevent a temperature of the circulation water above 180 degrees energizing solenoid 36, as before described, and thus neutralizing the action of solenoid 46, in cold weather, I disable the circuit for 36 by having solenoid 46, whenever energized, also pull open circuit breaker 37. When the outdoor temperature is above 10 and solenoid 46 deenergized, spring 37ª closes this circuit breaker and reestablishes the possible circuit through solenoid 36, for the normal operation in mild weather before explained.

It should be remembered that no matter whether the coils are in multiple under control of thermostat 43, or in series or series-multiple under control of aquastat 33, the indoor thermostat 23 is operating continuously, under variations of room temperature, to close or open the current supply circuit according as the room gets too cold or too hot, with the particular amount of current then being consumed by the heater coils 59ª, 59ᵇ and 59ᶜ.

Various changes can be made in the details of construction above described without departing from the underlying principles of the invention so long as the general methods of construction and operation thereby illustrated, are retained. Certain features of my invention could also be omitted in particular cases without seriously reducing its efficiency and usefulness of the remaining portions of the combination. Other forms of electro-magnetic motor devices could be substituted for the solenoids and movable cores therefor herein shown.

As previously explained, the invention has been described in detail as applied in a system in which water is the heat conveying medium or heat transferring agency as being perhaps, the best practical embodiment thereof. If, however, the heat of coils 59ª, 59ᵇ and 59ᶜ were transferred to a current of steam or air which was conducted from such heating source to the room or rooms to be heated thereby, the thermostat 33 could then be placed in the steam passage or on the boiler, or in the current of air, as occasion might require or render most advisable. Also if said electric heating coils were placed in the room or car to be heated for directly heating the same, the casing or support for said coils, and the metal of the coils themselves, would form the heat transferring agent or medium by which the atmosphere of said room or compartment was heated, and thermostat 33 would then be placed in the heater casing, or directly on the heater or on its support, so that it would be similarly responsive to the local temperature at or in the coils and thereby regulate the circuit connections therefor in the manner above described.

Having described my invention I claim:

1. In an electrical system for heating buildings and the like the combination of a suitable heat conveying medium, an electrical heating unit in operative relation with said medium and adapted to transfer heat thereto, which said unit comprises a plurality of separate current resistors, a current supply circuit of substantially constant voltage, means responsive to variations in temperature of said medium for connecting said resistors in parallel or in series with said supply circuit and independent means for controlling current in said supply circuit responsive to variations in temperature of the atmosphere of the space being heated.

2. In an electrical system for heating buildings and the like the combination of a suitable heat conveying medium, an electric heating unit in operative relation with said medium and adapted to transfer heat thereto, which said unit comprises a plurality of separate current resistors, a current supply circuit of substantially constant voltage, and apparatus responsive to variations of temperature of said heat conveying medium of the atmosphere of the space to be heated and of the atmosphere exterior of the building, adapted to control the circuit of current conveying connections to said resistors.

3. In an electrical system for heating the interiors of buildings and the like the combination of an electrical heating unit comprising a plurality of separate current resistors, a current supply circuit therefor, a thermostat inside the building adapted to open and close said supply circuit, and means for varying the connections of said resistors to said supply circuit and to one another which said means comprises a thermostat responsive to the temperature of the atmosphere exterior of the building.

4. In an electrical system for heating the interiors of buildings and the like the combination of an electrical heating unit comprising a plurality of separate current resistors, a current supply circuit therefor, and means for varying the connections of said resistors to said supply circuit and to one another, which said means comprises a thermostat responsive to the temperature of the atmosphere exterior to the building.

5. In an electrical system for heating the interiors of buildings and the like the combination of an electrical heating unit comprising a plurality of separate current resistors, a current supply circuit therefor, and means for varying the connections of said resistors to said supply circuit and to one another, which said means comprises a thermostat responsive to the temperature of the atmosphere exterior to the building and means responsive to variations of temperature of the space being heated.

6. In an electrical system for heating the interiors of buildings and the like the combination of an electrical heating unit comprising a plurality of separate current resistors, a current supply circuit therefor, and means for varying the connections of said resistors to said supply circuit and to one another, which said means comprises a thermostat responsive to the temperature of the atmosphere exterior to the building and adapted to throw said resistors into parallel connection with said supply circuit whenever said exterior temperature falls below a predetermined point.

7. In an electrical system for heating buildings and the like the combination of a suitable heat conveying medium, an electrical heating unit in operative relation with said medium and adapted to transfer heat thereto, which said unit comprises a plurality of separate current resistors, a current supply circuit of substantially constant voltage, means responsive to variations in the temperature of said medium adapted to shift the said resistors from series connection with said supply circuit to a different arrangement and back again to series, and means responsive to decreases in temperature of the atmosphere exterior of the building for shifting all said resistors into multiple connection with said supply circuit.

8. In an electrical system for heating buildings and the like the combination of a suitable heat conveying medium, an electrical heating unit in operative relation with said medium and adapted to transfer heat thereto, which said unit comprises a plurality of separate current resistors, a current supply circuit of substantially constant voltage, means responsive to variations in the temperature of said medium adapted to shift the said resistors from series connection with said supply circuit to a different arrangement and back again to series, and means responsive to decreases in temperature of the atmosphere exterior of the building for shifting all said resistors into multiple connection with said supply circuit together with a thermostat responsive to changes in temperature of the atmosphere of the space being heated and adapted to open and close said supply circuit.

9. In an electrical system for heating buildings and the like the combination of a suitable heat conveying medium, an electrical heating unit in operative relation with said medium and adapted to transfer heat thereto, which said unit comprises a plurality of separate current resistors, a current supply circuit of substantially constant voltage, means responsive to variations in the temperature of said medium adapted to shift the said resistors from series connection with said supply circuit to a different arrangement and back again to series, and means responsive to decreases in temperature of the atmosphere exterior of the building for shifting all said resistors into multiple connection with said supply circuit, and for contemporaneously disabling said first mentioned means.

10. In an electric heating system the combination of an electrical heating unit comprising a plurality of separate current resistors and means for connecting said resistors all in series, or all in parallel, or some in series one with another, and another resistor in parallel with said last mentioned series.

11. In an electric heating system the combination of an electrical heating unit comprising a plurality of separate current resistors and means for connecting said resistors all in series, or all in parallel, or some in series with another, and another resistor in parallel with said last mentioned series together with a plurality of separate automatic devices each adapted to produce some of the above specified variations in resistor connections, and each responsive to the local temperature to which it is exposed.

12. In an electric heating system the combination of an electrical heating unit comprising a plurality of separate current resistors and means for connecting said resistors all in series, or all in parallel, or some in series one with another, and another resistor in parallel with said last mentioned series together with a plurality of separate automatic devices each adapted to produce some of the above specified variations in resistor connections, and each responsive to the local temperature to which it is exposed, one of said automatic devices being located in the interior of a building in which said unit is placed and another being exposed to the atmosphere exterior of said building.

13. In an electrical system for heating buildings and the like the combination of a suitable heat conveying medium, an electrical heater comprising three separate current resistors in operative relation to said heat conveying medium, a current supply circuit, means for connecting said resistors in series with said supply circuit, or in parallel therewith, or two of them in series therewith and the other directly across said supply circuit, a thermostat located in the space to be heated adapted to control the current in said supply circuit, a device responsive to variations in temperature of said heat conveying medium adapted to shift said resistors from series to the above mentioned series and multiple connection with said supply circuit and back again, and a thermostat exposed to the atmosphere exterior of the building adapted to shift said resistors from the above mentioned series and multiple connection to multiple connection with said supply circuit and back again.

14. A combination such as set out in claim 13 in which the last mentioned thermostat is also adapted while the multiple connection is established to disable the device which is responsive to variations of temperature in said heat conveying medium.

15. In an electric heating system the combination of heating and current supply electric circuits, a master switch controlling the connection of said heating circuits to said supply circuit which said switch comprises a foundation of insulating material, two parallel conducting strips mounted thereon, on which strips the terminals of the supply circuit may bear, a set of contacts mounted on said foundation on which the terminals of all the heating circuits may bear and be thereby connected in series with the supply circuit, a second set of contacts by which said heating circuits may be similarly connected in multiple and a third set of contacts by which said heating circuits may be similarly connected partly in series and partly in multiple, and means for moving said switch foundation along the line of said parallel strips, whereby the respective sets of contacts above described may be successively brought under the heating circuit terminals while said parallel strips are contemporaneously under said supply circuit terminals and the relative connections of said heating circuits be thereby shifted accordingly.

16. A circuit controlling device for an electric heating system, which device comprises, in combination a cylinder of insulating material, means for rotating said cylinder, two rings of conducting material mounted and spaced apart thereon, three rows of four separate contacts each mounted on said cylinder surface and extending between said rings, two supply circuit terminals resting one on each ring, and three pairs of work circuit terminals arranged with the outermost member of each outside pair resting on one of said rings, and the remainder adapted to bear each upon one of said contacts when said cylinder is rotated to the proper extent, the contacts of one row being connected together in two pairs, two of the middle row being connected together and the others connected one to one ring and the other to the other ring, and one member of each pair of the third row being connected to one ring while the other member of each is connected to the other ring, whereby on rotation of said cylinder said work circuits are connected in series with said supply circuit, in parallel therewith, or two in series therewith and the third bridged directly across said supply circuit according to the extent of rotation of said cylinder.

17. A combination such as set out in claim 16 in which said cylinder rotating means comprises electro-magnetic motor apparatus mechanically connected to said cylinder and a yielding pressure device for holding said cylinder in mid-position with the work circuit terminals resting on the middle row of said contacts.

WALTER E. HUDSON.